United States Patent
Vishakantaiah et al.

(10) Patent No.: US 10,936,013 B2
(45) Date of Patent: *Mar. 2, 2021

(54) ELECTRONIC DEVICE WITH TRANSPARENT DISPLAY

(71) Applicant: INTEL CORPORATION, Santa Clara, CA (US)

(72) Inventors: Praveen Vishakantaiah, Hillsboro, OR (US); Zhiming J. Zhuang, Sammamish, WA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/426,210

(22) Filed: May 30, 2019

(65) Prior Publication Data

US 2019/0278333 A1  Sep. 12, 2019

Related U.S. Application Data

(62) Division of application No. 15/281,752, filed on Sep. 30, 2016, now Pat. No. 10,317,945.

(51) Int. Cl.
*G06F 1/16* (2006.01)
*G06F 3/0484* (2013.01)

(52) U.S. Cl.
CPC .......... *G06F 1/1647* (2013.01); *G06F 1/1616* (2013.01); *G06F 1/1637* (2013.01); *G06F 1/1643* (2013.01); *G06F 1/1654* (2013.01); *G06F 3/04845* (2013.01); *G06F 2203/04804* (2013.01)

(58) Field of Classification Search
None
See application file for complete search history.

(56) References Cited

U.S. PATENT DOCUMENTS

| 2003/0218222 | A1* | 11/2003 | Wager, III | H01L 29/45 |
| | | | | 257/410 |
| 2013/0113835 | A1 | 5/2013 | Sirpal et al. | |
| 2015/0220299 | A1 | 8/2015 | Kim et al. | |
| 2015/0228217 | A1 | 8/2015 | Perdices-Gonzalez et al. | |
| 2016/0012641 | A1 | 1/2016 | Kim et al. | |
| 2017/0161824 | A1* | 6/2017 | Ramos | G06T 19/006 |

* cited by examiner

*Primary Examiner* — YuJang Tswei
(74) *Attorney, Agent, or Firm* — Hanley, Flight & Zimmerman, LLC

(57) ABSTRACT

An apparatus is described. The apparatus includes a transparent display having pixels that appear transparent when in an off mode, and appear as one or more colors when in an on mode. The apparatus also includes a frame surrounding a perimeter of the transparent display. The frame includes non-transparent components that present images on the transparent display. The apparatus additionally includes a connected member that is connected with the transparent display. The connected member provides a contrast to the transparent display when the connected member is positioned opposite a viewing side of the transparent display.

21 Claims, 13 Drawing Sheets

700

ELECTRONIC DEVICE WITH TRANSPARENT DISPLAY

CROSS REFERENCE TO RELATED APPLICATIONS

The present application is a Divisional application of U.S. patent application Ser. No. 15/281,752, by Vishakantaiah et al., entitled "Electronic Device with Transparent Display," filed Sep. 30, 2016, and which is incorporated herein by reference.

BACKGROUND

Generations of computing devices have traditionally been used with displays that are opaque. It is not possible to see through an opaque display, which typically includes at least one opaque element, such as a backlight unit, a reflective metal electrode, a plastic or metal backing. Additionally, the display pixel output states range from full white to black. Some displays are in their white state when powered off. These displays are typically referred to as, normally white displays. Other displays will be in their black state when turned off, those are called normally black displays. However, future generations of computing devices will likely include transparent displays. Such displays have pixel output states ranging from full white to transparent. Transparent displays may be composed of various materials capable of showing images across the display viewing area, while appearing see-through in areas of the display without images.

BRIEF DESCRIPTION OF THE DRAWINGS

FIG. 1B is a diagram of the example computing device 100, with the transparent display 102, powered on;

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1A:
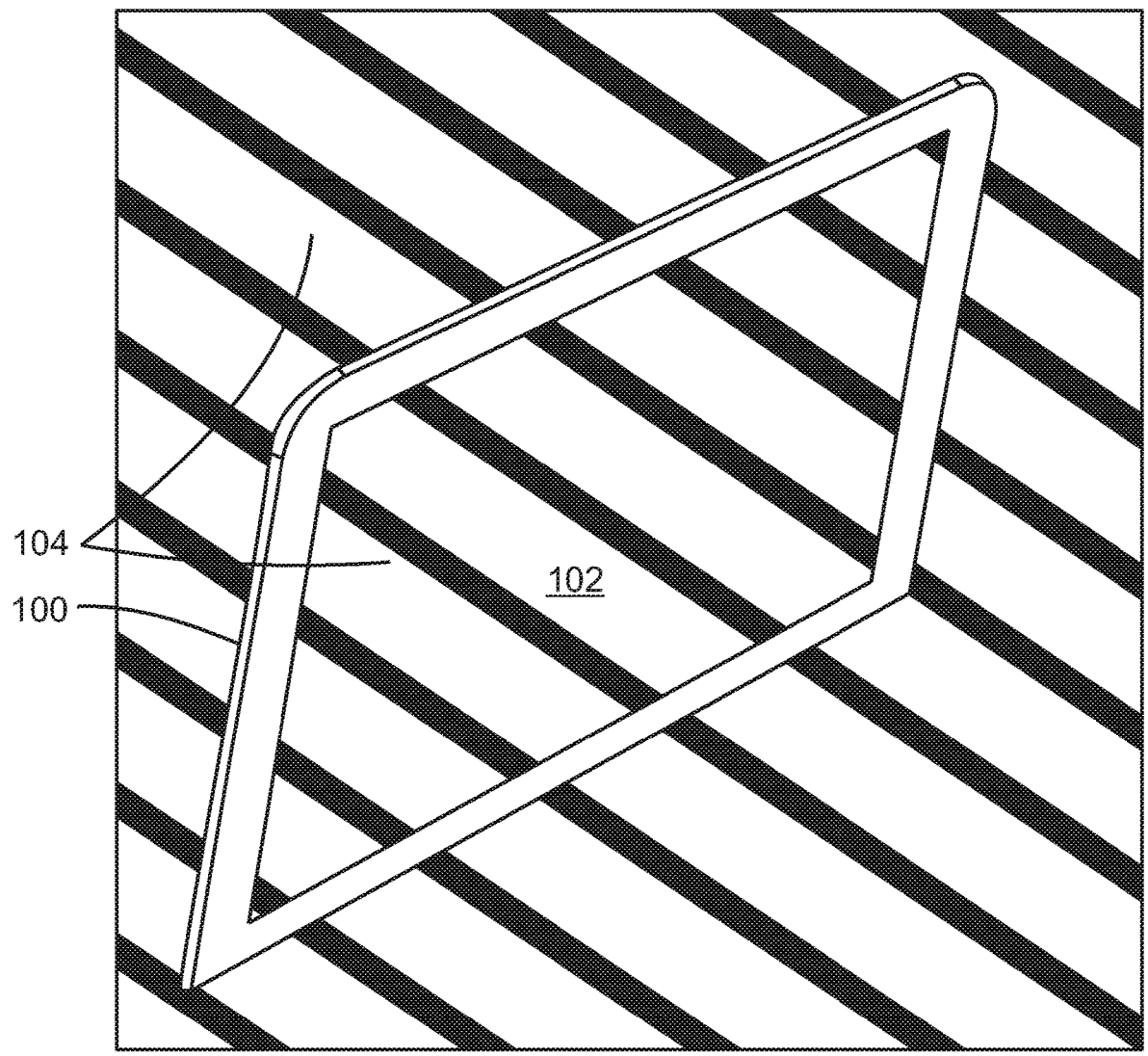
FIG. 1A is a diagram of an example computing device 100 with a transparent display 102, powered off.

In the following description, numerous specific details are set forth, such as examples of specific types of processors and system configurations, specific hardware structures, specific architectural and micro architectural details, specific register configurations, specific instruction types, specific system components, specific measurements or heights, specific processor pipeline stages and operation, etc., in order to provide a thorough understanding of the present invention. It will be apparent, however, to one skilled in the art that these specific details need not be employed to practice the present invention. In other instances, well known components or methods, such as specific and alternative processor architectures, specific logic circuits or code for described algorithms, specific firmware code, specific interconnect operation, specific logic configurations, specific manufacturing techniques and materials, specific compiler implementations, specific expression of algorithms in code, specific power down and gating techniques or logic and other specific operational details of computer system have not been described in detail in order to avoid unnecessarily obscuring the present invention.

Liquid crystal display (LCD), light-emitting diode (LED), and organic LED (OLED) are some of the technologies used for displays. Most of these displays are not transparent due to opaque elements used in the display module design to enable the some basic functionality of the display or optimize its operational efficiency, such as the backlight unit used in LCDs to better image quality and dark environment readability, and reflective electrode in the case of OLED to enhance the display brightness. However, recent advancement of the display technology has made it possible to enable transparent full color displays, particularly with OLED technology. Because OLED is an emissive display that does not need any separate light unit that has one of the gating item for display transparency. The improvement in the OLED emissive efficiency has also made it possible to have a good display brightness without using a reflective electrode on one side of the display. These characteristics and others enabled the display to appear transparent. Transparent OLED displays have two layers of see-through substrates, one on either side of numerous addressable pixels. One of the substrate consist of the circuitry that selectively send the driving signals to the display pixels while the other substrate typically consist of a continuous transparent electrode. Due to this difference, even though such transparent display can display images on both sides, there is a preferred viewing side where the image quality is noticeably better. In other words, the viewable images from each side are asymmetrical in quality. One side provides a brighter, sharper image than the image appearing through the other side of the transparent display. In many cases, this brighter, sharper image side is used as the primary display viewing direction in the product design.

It is now feasible to provide a transparent display that provides grayscale, and color image quality for display-capable computing devices. Such transparent displays can help expand potential system designs, and use case scenarios, for various types of display-capable devices; potentials that are not easily supported by traditional opaque displays. As discussed in further detail below, transparent displays make it possible to expand how computing devices are used, and the potential for these devices to deliver new, unique computing experiences.

In some embodiments, color content displaying and see-through capabilities of a transparent display are combined, while at the same time mitigating transparent display limitations, such as contrast in a bright environment and asymmetrical viewing.

Figure 1B:
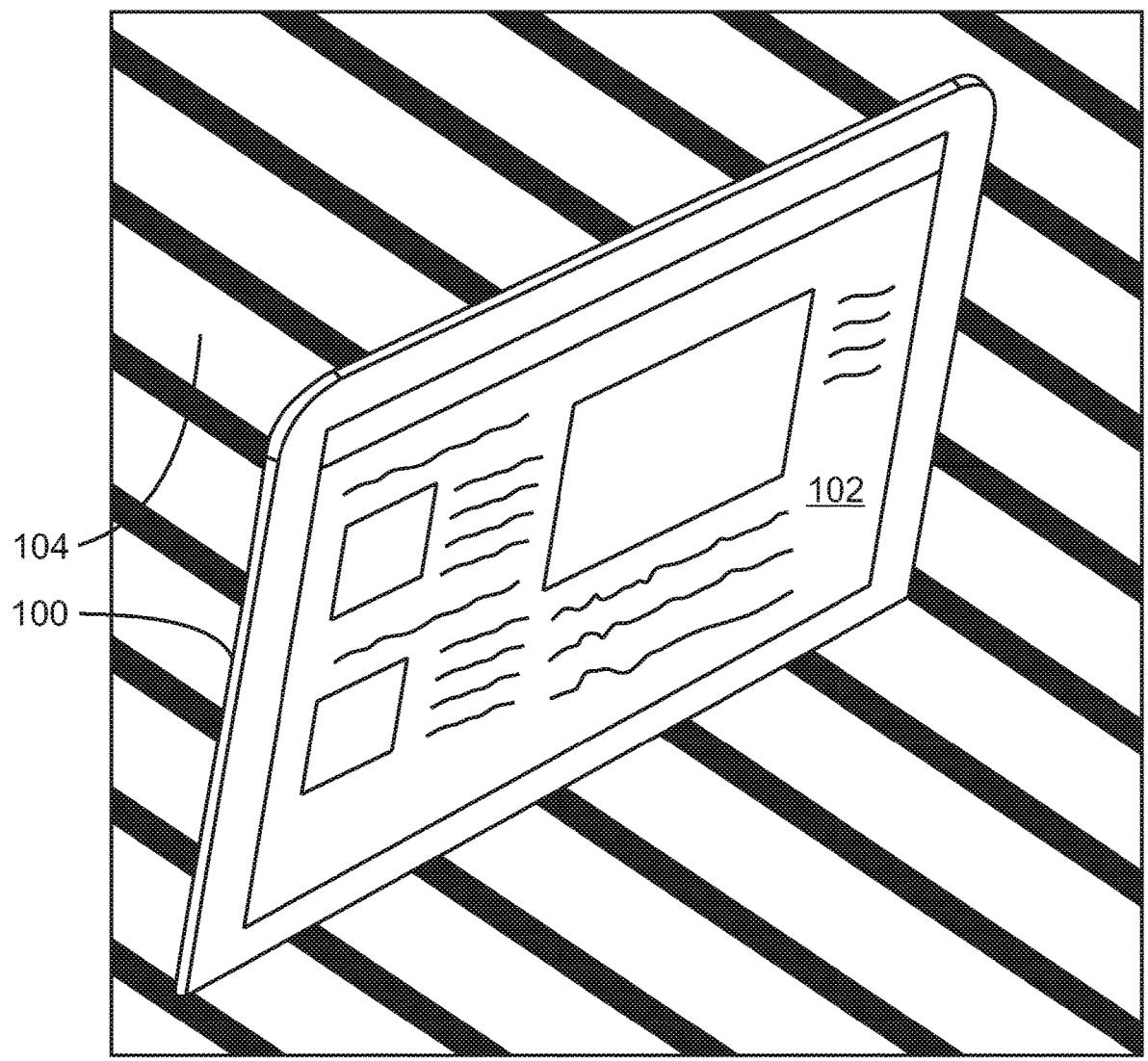

FIG. 1A is a diagram of an example computing device 100 with a transparent display 102, with all pixels in its transparent state. The example computing device 100 in FIGS. 1A, 1B is a tablet device. However, the claimed subject matter is not limited to tablet devices. Rather, the computing device 100 may be a smartphone, laptop, phablet, a wearable device, or any other display-capable computing device. When the transparent display 102 in its transparent state, the transparent display 102 is blank. In other words, in this blank state the transparent display 102 is see-through to an ambient background 104 behind the transparent display 102.

FIG. 1B is a diagram of the example computing device 100, with the transparent display 102, displaying a image content. In FIG. 1B, the transparent display 102 is operating in a full-color image mode. In this mode, the transparent display may show pixels of colors across the spectrum in presenting content, such as a web page. In this example, all the pixels of the transparent display 102 are being used, thus blocking the view through the transparent display 102. However, in some embodiments, the parts of the image may be blank to enable seeing through the transparent display 102 via such background pixels. For example, in some embodiments, the parts of the image that constitute a background of the image may be blank, to enable seeing through the transparent display 102 via such background pixels.

Another difference between transparent displays and opaque displays is in the placement of non-transparent components of the display. With opaque displays, the non-transparent components of the display and associated computing device may be positioned just about anywhere provided the placement does not block sight of the display. This is typically accomplished with opaque displays by placing non-transparent components behind the display component, or within another device. However, with the transparent display 102, these non-transparent components may not be placed behind the display component without affecting how a displayed image appears. Accordingly, as shown in FIGS. 1A, 1B, the non-transparent components may be positioned in a frame 106 around the transparent display 102, providing an efficient way to distribute and disseminate heat generated by these components. In other embodiments, the non-transparent components of the computing device 100 and transparent display 102 may be positioned at one end of the computing device 100.

Figure 2A:
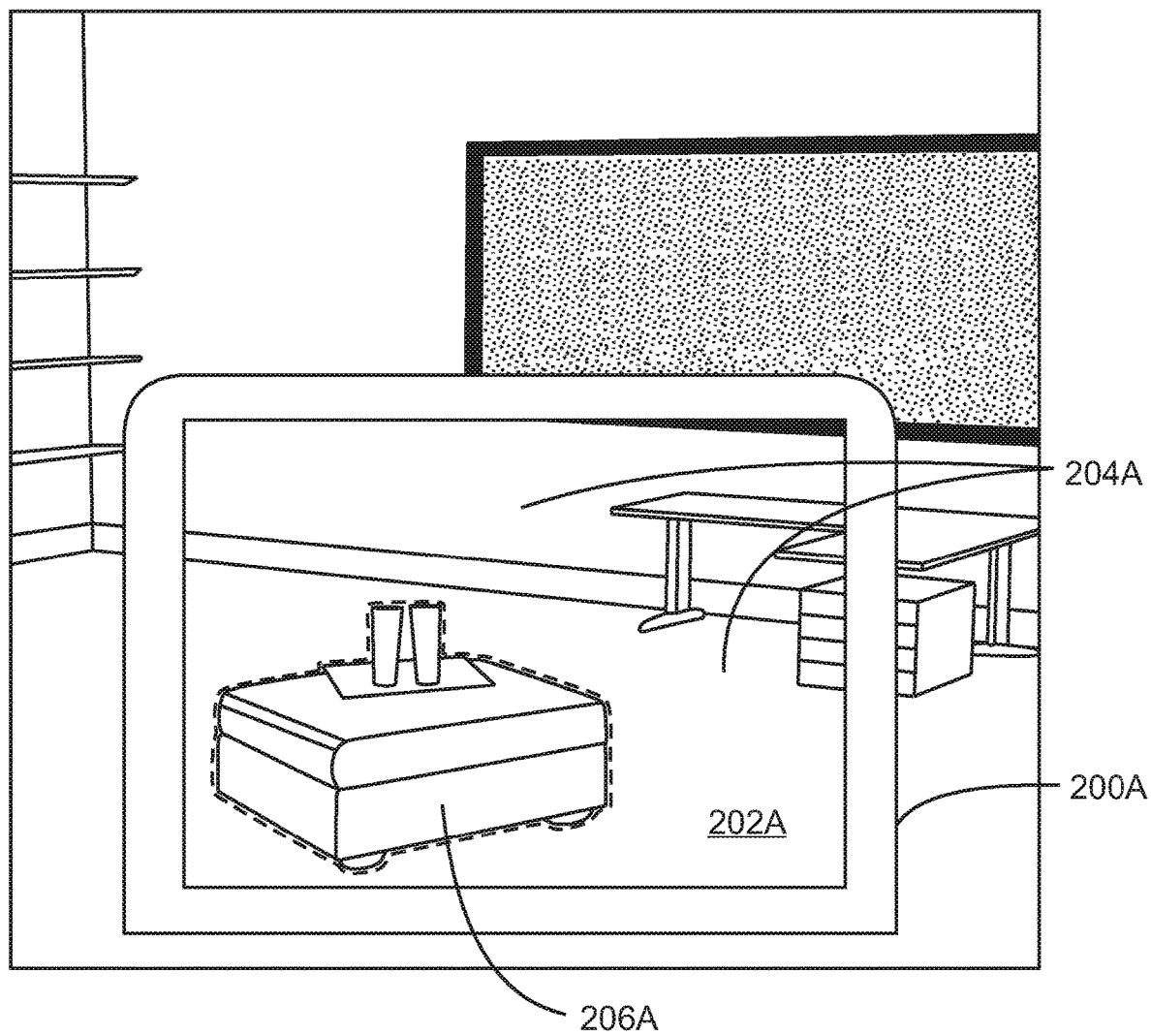
FIGS. 2A-2C accordingly show an example of generating and showing a cropped image on a computing device such as a tablet device with a transparent display.
Figure 2B:
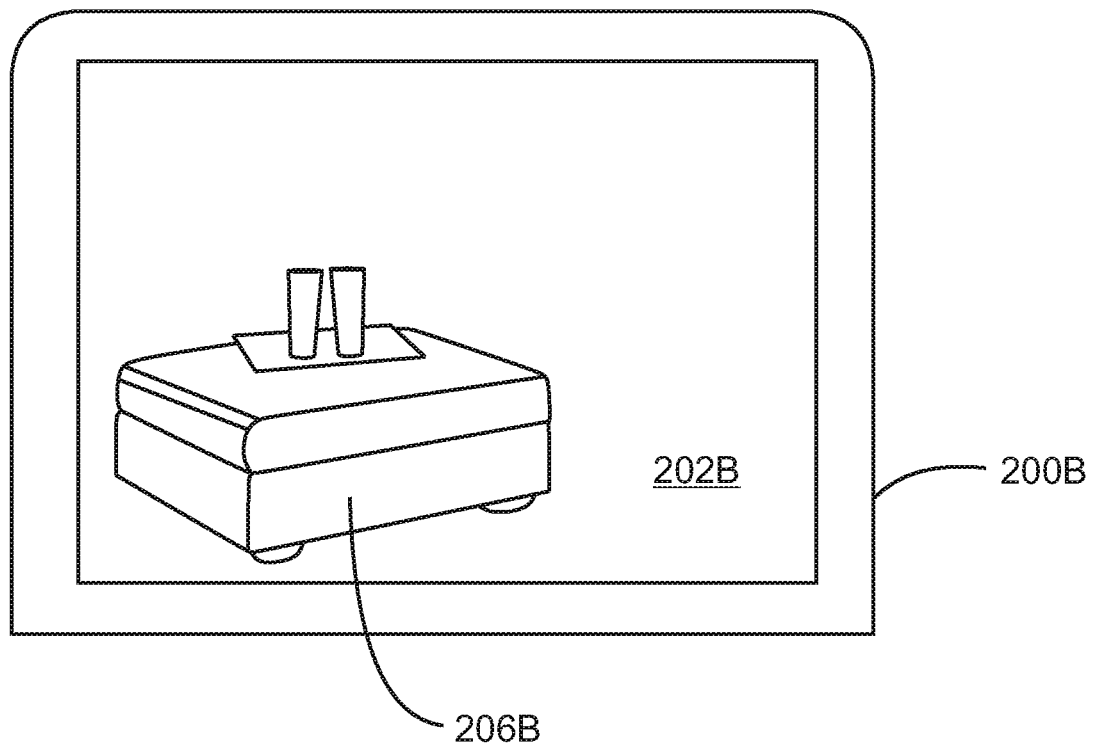
Figure 2C:
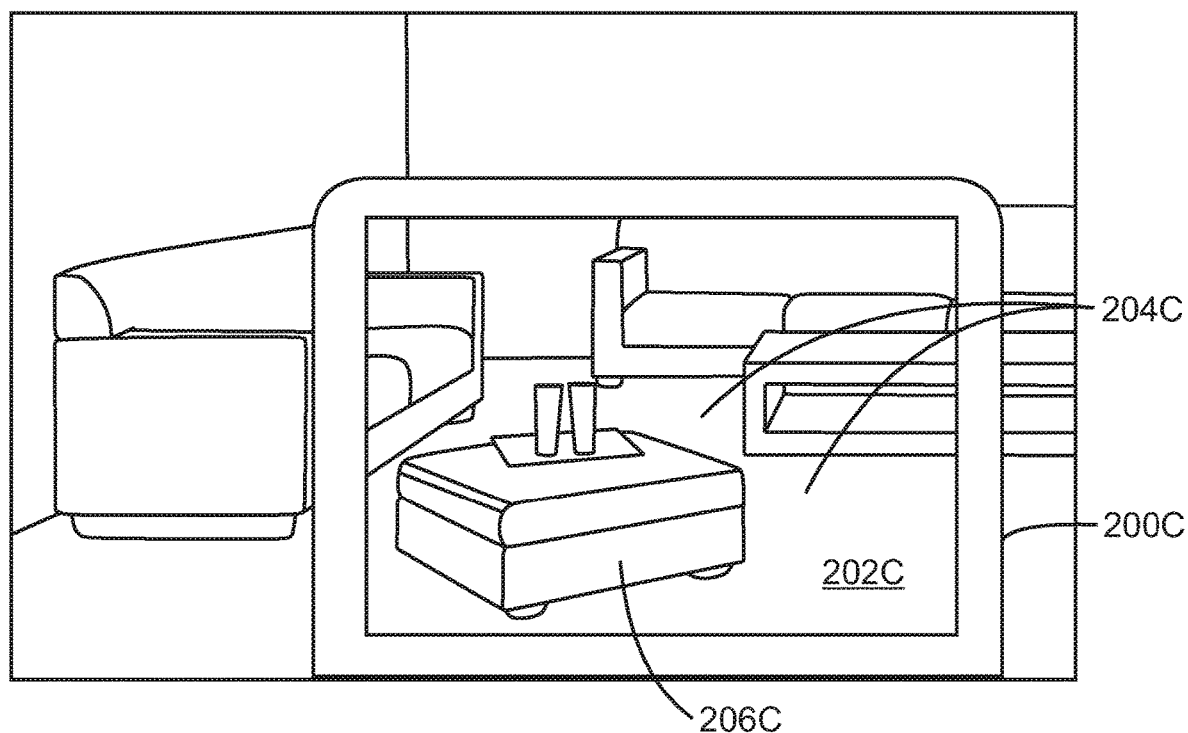

One practical application of a tablet with a transparent display takes advantage of the incorporation of the ambient background into a previously captured image. For example, a photograph may be cropped to remove the background from the photograph. This cropped image may then be shown on the transparent display, and the cropped image will appear to have been transferred from its original environment to the current environment, represented in the ambient background. FIGS. 2A-2C accordingly show an example of generating and showing a cropped image 206C on a tablet device 200C with a transparent display 202C. As shown in this example, it is possible to use an example tablet device to determine if an item of furniture, photographed at the store, would fit in another space, such as the living room of one's home.

FIG. 2A shows a computing device 200A (for example, a tablet device) with a transparent display 202A capturing a photograph in an original ambient background 204A. The original ambient background 204A may be the store where an item of furniture 206A, shown in outline, may be for sale. The photograph may be a color image, which may be cropped and overlaid within a new background environment, using the see-through feature of the display to create a rich user experience.

FIG. 2B is an example computing device 200B showing a cropped image 206B of the item of furniture. There are many software tools that enable the manipulation of images, such as cropping. According to some embodiments, cropping can be defined as selecting objects or regions of an image and isolating the selections from the remaining portions of the image. This can enable the overlay of the selected objects on a new background environment through the transparent portion of the display. In this example, the cropped image 206B has been cropped from its original ambient background 204A.

FIG. 2C is an example tablet device 200C showing a cropped image 206C overlaid within a new ambient background 204C. The new ambient background 204C may be the home where the item of furniture 206A would be placed. In this example, pixels within the transparent display 202C representing the cropped image 206C are set to display in a color-displaying mode. In some embodiments, the remaining pixels in the transparent display 204C are set in the transparent state to allow see-though blending of the cropped image 206C with the new ambient background 204C. In other embodiments, the remaining pixels of the transparent display may appear white to create opaque white background.

It is noted that the devices 200A, 200B, 200C may be the same device, or different devices, or different types of computing devices. The computing devices 200A and 200C may be tablet devices, or any other computing device capable of capturing and showing images. The computing device 200B may be the computing device 200A or any other computing device, with or without a transparent display, capable of cropping images. The device 200C may be the computing device 200A, or any other computing device with a transparent display.

With respect to FIGS. 1 and 2, a tablet computing device with a transparent display is discussed. However, in some embodiments, there may be a counterpart to the transparent display, connected through a foldable, attached, attachable, and/or detachable mechanism. In some embodiments, a foldable, attached, attachable, and/or detachable mechanism connecting a counterpart to a transparent display is reversible.

Figure 3:
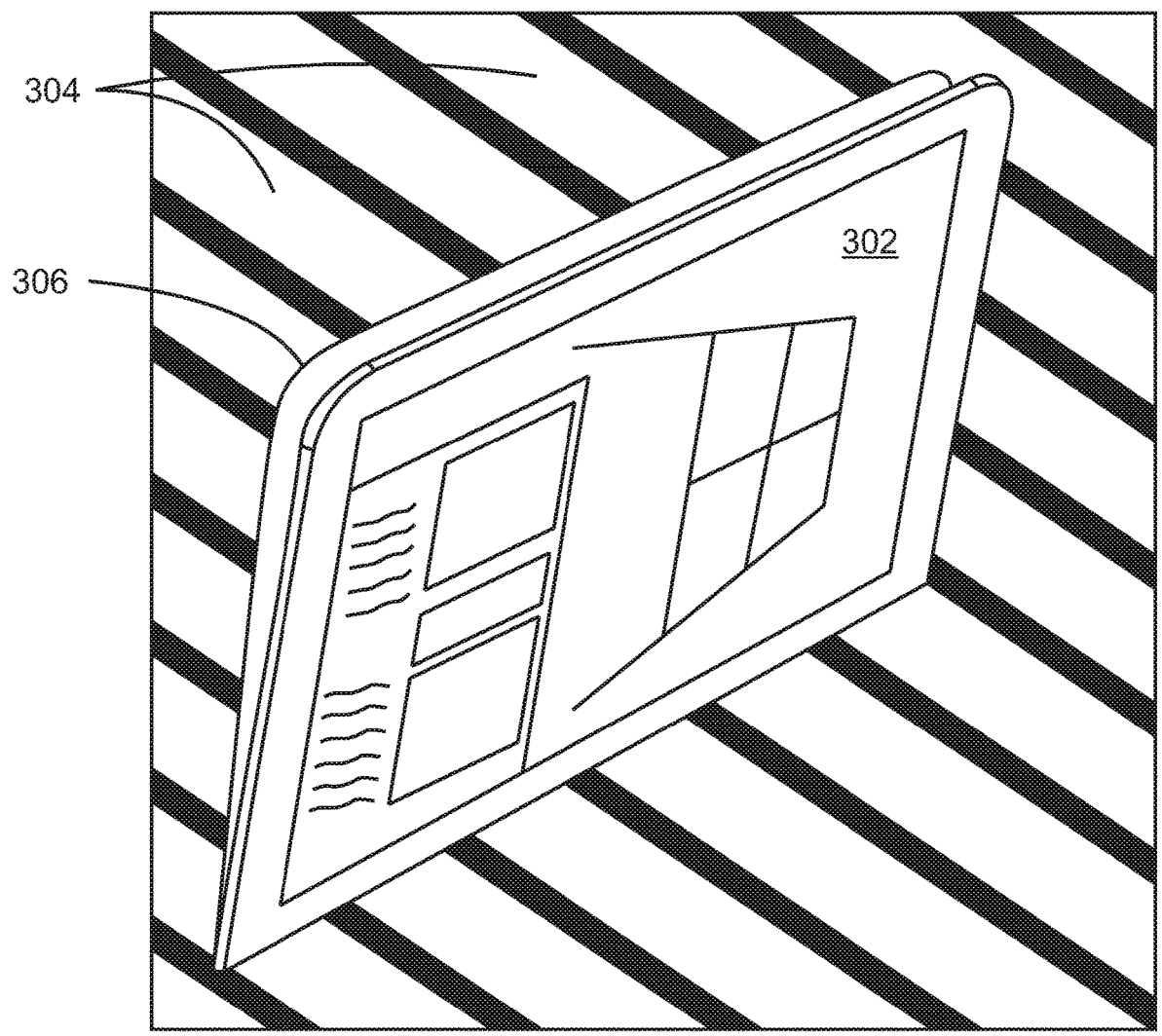
FIG. 3 is an example computing device with a transparent display and a counterpart.

FIG. 3 is an example computing device 300 with a transparent display 302, and a counterpart 306. The counterpart 306 may be a simple black or colored cover. Alternatively, the counterpart 306 may be used to house non-transparent components of the system, such as a mother board and battery. Such a placement would reduce the bezel of the transparent display 302 of the device 300. In such an embodiment, the counterpart 306 may be attached to the transparent display 302, capable of swiveling like a typical laptop. In some embodiments, such an attached counterpart is detachable by a user. The counterpart 306 can thus fold behind the transparent display 302 to provide a black background to enhanced the contrast to the images shown, such as when displaying color in bright light. As discussed previously, the viewing appearance of transparent OLED displays is not symmetrical from both sides. There is a viewing side where the full color image looks better than what appears through the opposite side. Thus, the counterpart 306 may be foldable to cover the side of the transparent display 302 opposite the viewing side.

As discussed previously, the transparent display 302 does provide a see-through capability that an opaque display cannot. However, transparent displays 302 could not generate black pixels, whereas opaque displays typically create a black as one of its electro-optical states. For transparent display contrast may be achieved by the background shown behind the display. With respect to the traditional use of plain, black, backgrounds, the transparent display 302 provides a new ability to incorporate ambient background 304 into the images shown. For example, in one embodiment of the claimed subject matter, a traditional, or modified, black background is provided via a counterpart 306 that is an electro-optical material (not shown) applied opposite to the viewing side of the transparent display 302. Individual elements of the electro-optical material may be turned on, to display a black color, or turned off, to appear transparent. Turning the elements of the electro-optical material on and off may be accomplished by sending electric signals to specific elements of the electro-optical material. In combination with the black color provided by the electro-optical material, numerous colors across the spectrum may be used in the counterpart 306, to creatively define backgrounds with selected colors, patterns, designs, background images, parsings thereof, and the like.

Other possible counterparts 306 include a keyboard, keyboard and mousepad, another transparent display, a low-power display, and the like. Computing devices 300 with transparent displays 302 may also involve combinations thereof.

Figure 4:
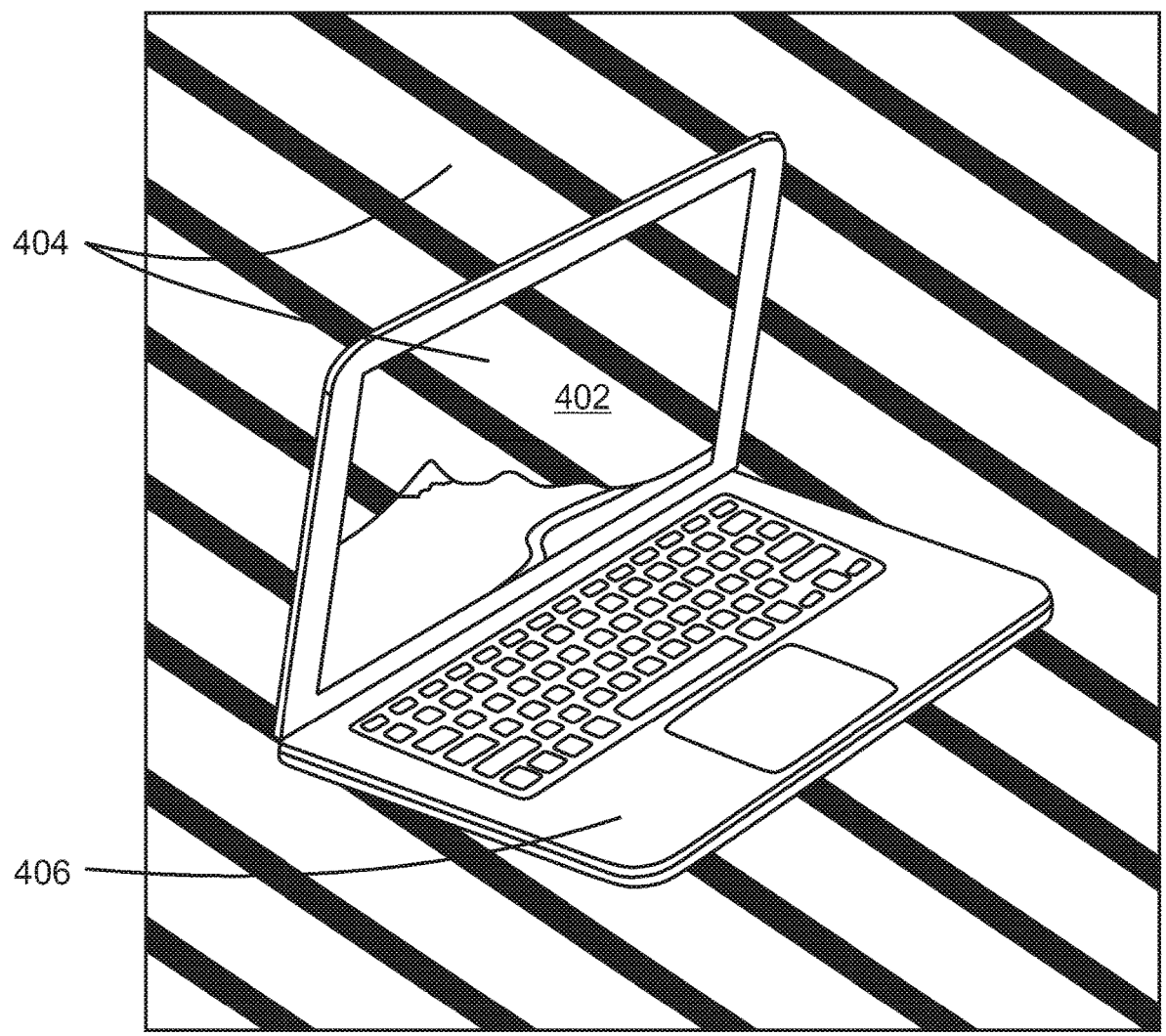
FIG. 4 is a diagram of an example computing device with a transparent display and a keyboard counterpart.

FIG. 4 is a diagram of an example computing device 400 with a transparent display 402 and a keyboard counterpart 406. The computing device 400 is positioned within ambient background 404, incorporated as background into the images shown on the transparent display 402. The computing device 400 may take the form of a traditional laptop computer, wherein the counterpart 406 may include a motherboard, battery, etc. Alternatively, and as described above with respect to FIG. 1, these components may be incorporated into the frame around the transparent display, such as transparent display 402. In another embodiment of the claimed subject matter, the counterpart 406 may be a low-power display.

Figure 5:
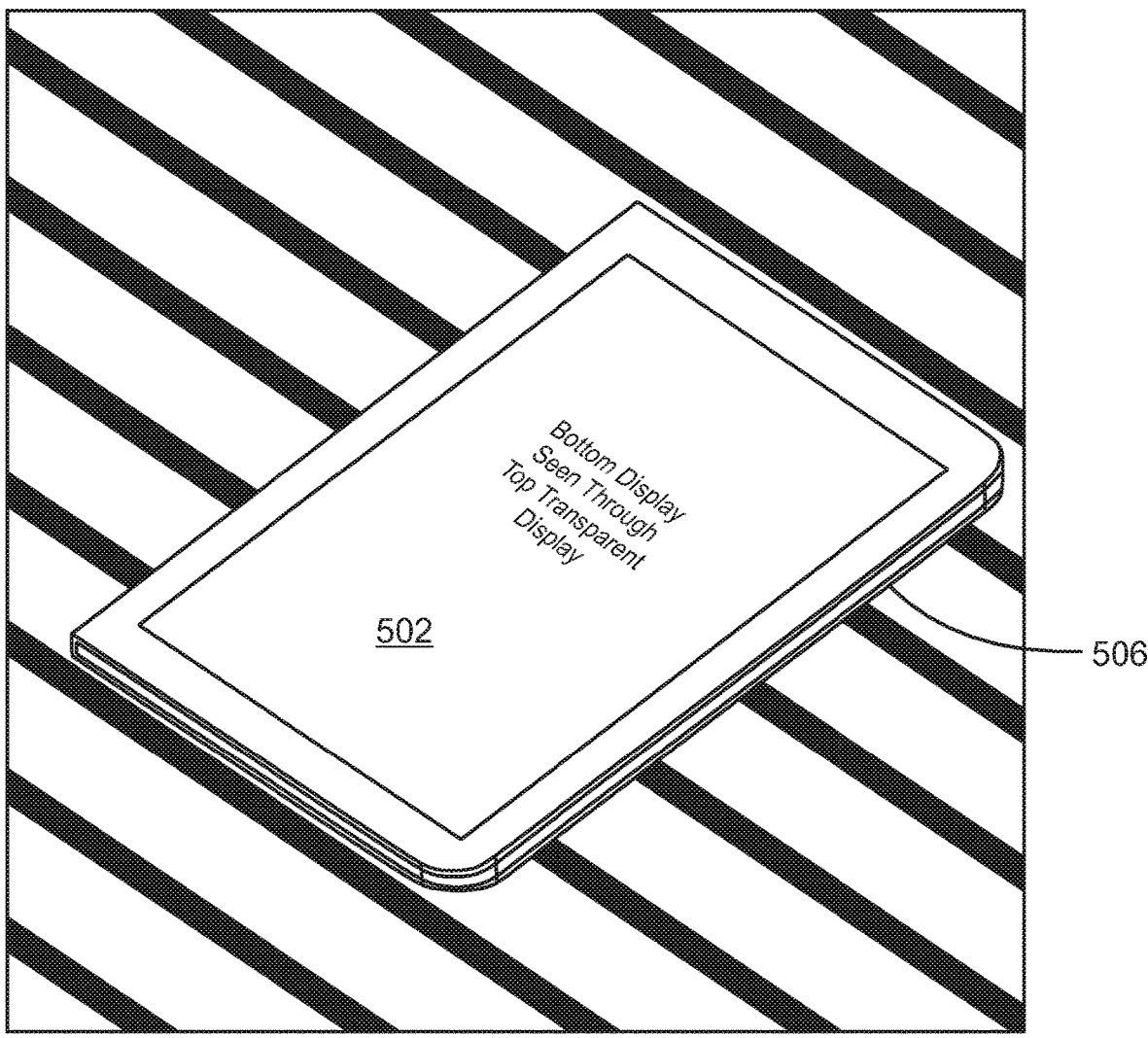
FIG. 5 is a diagram of an example computing device with a transparent display and a counterpart low-power display viewed through the transparent display.

FIG. 5 is a diagram of an example computing device 500 with a transparent display 502 and a counterpart low-power display 506. The low-power display may be an electrophoretic display. This example shows the message, "Bottom Display Seen Through From Top Transparent Display," on the low-power display 506. The low-power display 506 may also support stylus inputs, be used as an e-writing device, and morph into a digital keyboard, for use when the transparent display 502 is lifted, exposing the low-power display 506 below.

Alternatively, the low-power display 506 may be used to run low-power activities, such as, displaying the pages of an electronic book; displaying time, date, and the like; and running simple software, like a tic-tac-toe game, or a crossword puzzle. In such alternatives, the transparent display 502 may incorporate a touch sensitive screen on the back side of the transparent display 502. Such a touch screen enables the device 500 to receive inputs, which are useful for running any of these applications.

In some embodiments, a touch-sensitive transparent display, as discussed above, may be used in combination with a virtual keyboard and mouse pad shown on the low-power display. Touch inputs received on the back of the transparent display on top of the virtual keyboard may be translated into keystrokes for the virtual keys positioned below the touch inputs, and the strokes and touches above the mousepad would be translated to strokes and touches on the virtual mousepad. In such an alternative, the computing device 500 may send its display output to another display device, such as, for example, a television or a computer monitor (not shown).

Figure 6:
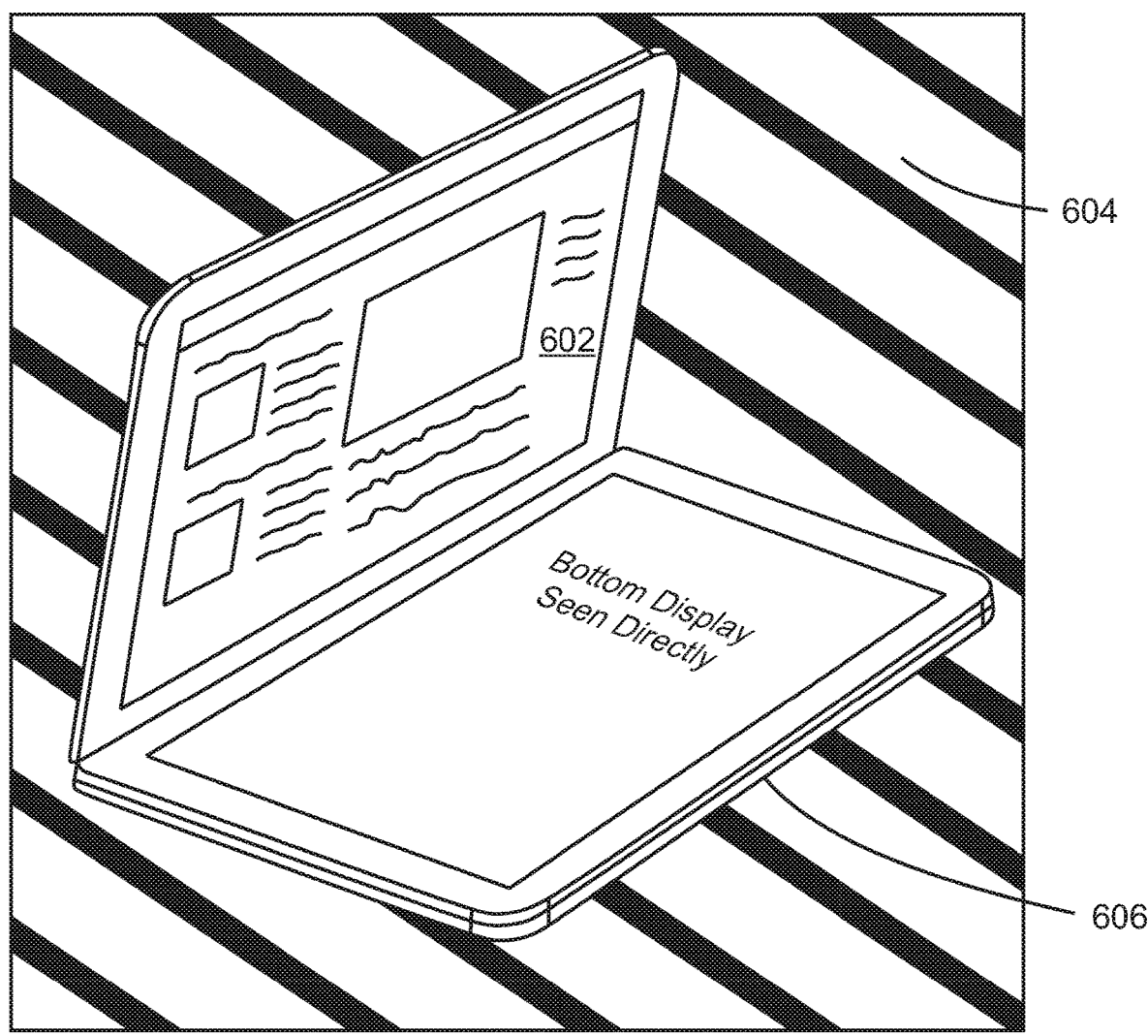
FIG. 6 is a diagram of an example device with a transparent display and a counterpart low-power display, both viewed directly.

FIG. 6 is a diagram of an example device 600 with a transparent display 602 and a counterpart low-power display 606. The example device 600 is shown with the device 600 open. The transparent display 602 is displaying a web page, and the counterpart low-power display 606 is displaying the message, "Bottom Display Seen Directly," in contrast to the message displayed with respect to FIG. 5.

Figure 7:
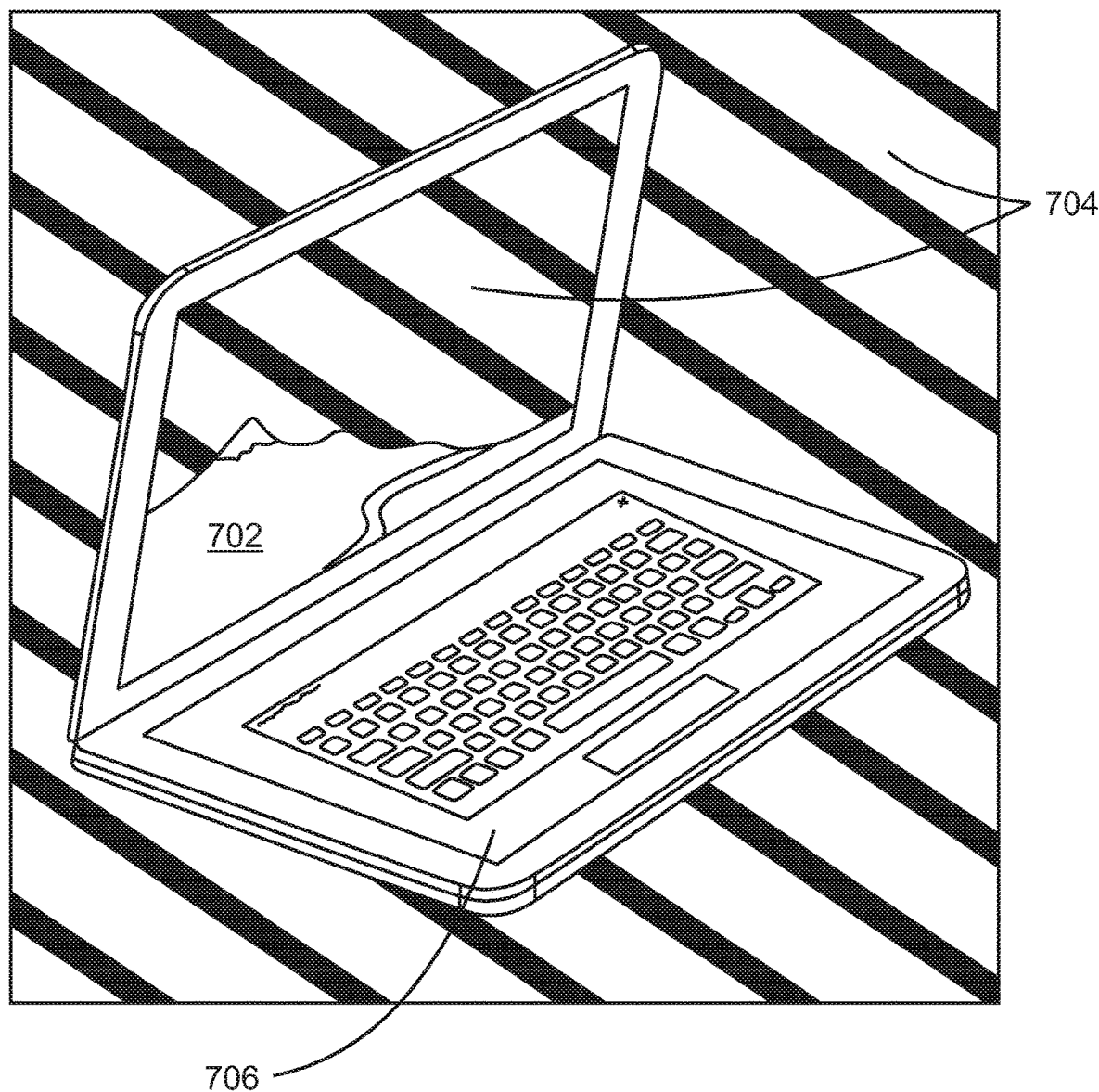
FIG. 7 is a diagram of an example device with a transparent display and a counterpart low-power display used as digital keyboard.

FIG. 7 is a diagram of an example device 700 with a transparent display 702 and a counterpart low-power display 706. The example device 700 is shown with the device 700 open. The transparent display 702 is showing an image of a stream and a mountain side, with ambient background 704 showing through the transparent display. The counterpart low-power display 706 is touch-sensitive, and is showing a virtual keyboard, whereon touch inputs are translated to keystrokes corresponding to the keys touched on the virtual keyboard. Additionally, the display shows a virtual touchpad, whereon strokes and touches made on a virtual touchpad are translated to touchpad inputs.

Figure 8:
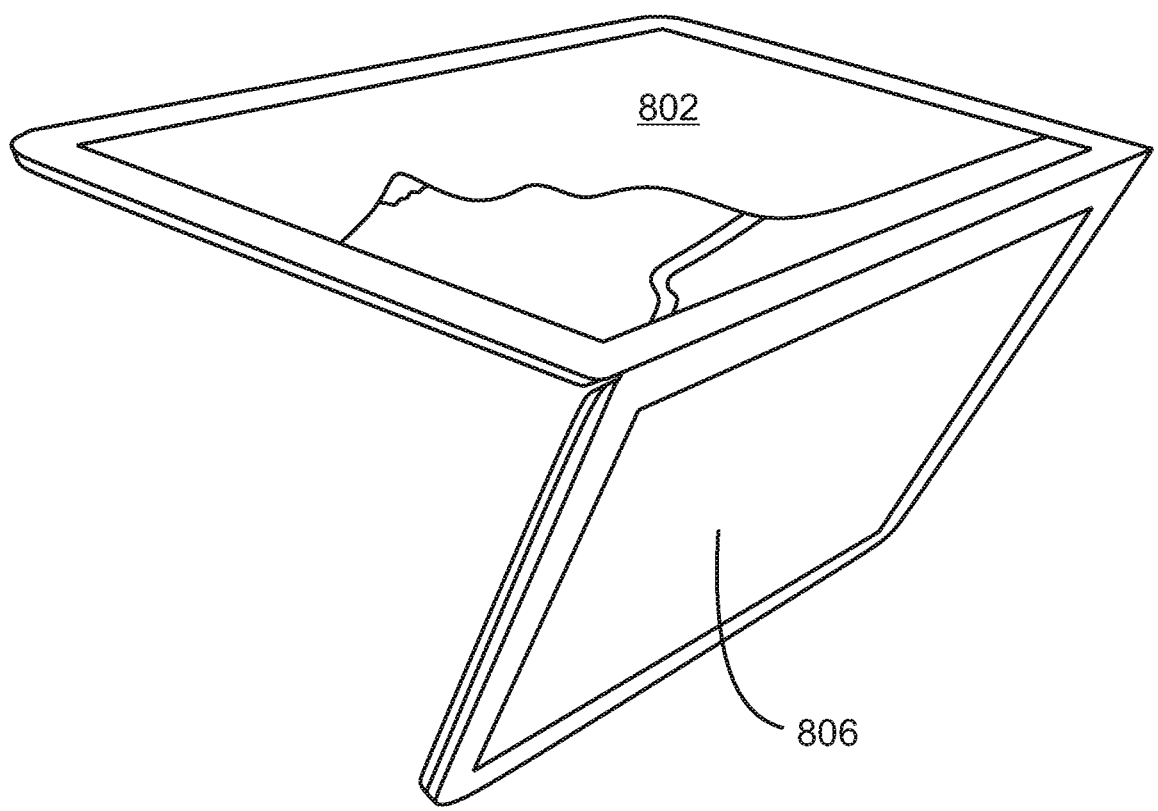
FIG. 8 is a diagram of an example computing device with a transparent display and a counterpart low-power display.

FIG. 8 is a diagram of an example computing device 800 with a transparent display 802 and a counterpart low-power display 806. The computing device 800 is similar to the computing device 500, but is shown with the transparent display 802 on and displaying an image, and with the low-power display turned off. Additionally, the low-power display 806 is shown being folded under the transparent display 802 to provide contrast. The backside of the lower power display 806 has an appropriate color to mitigate the contrast limitation of the transparent display 802 when used in a bright environment.

As stated previously, the transparent display itself can also have the touch input capability on either side of the transparent display. This capability is useful to provide means for user inputs for applications, such as tracing.

Figure 9:
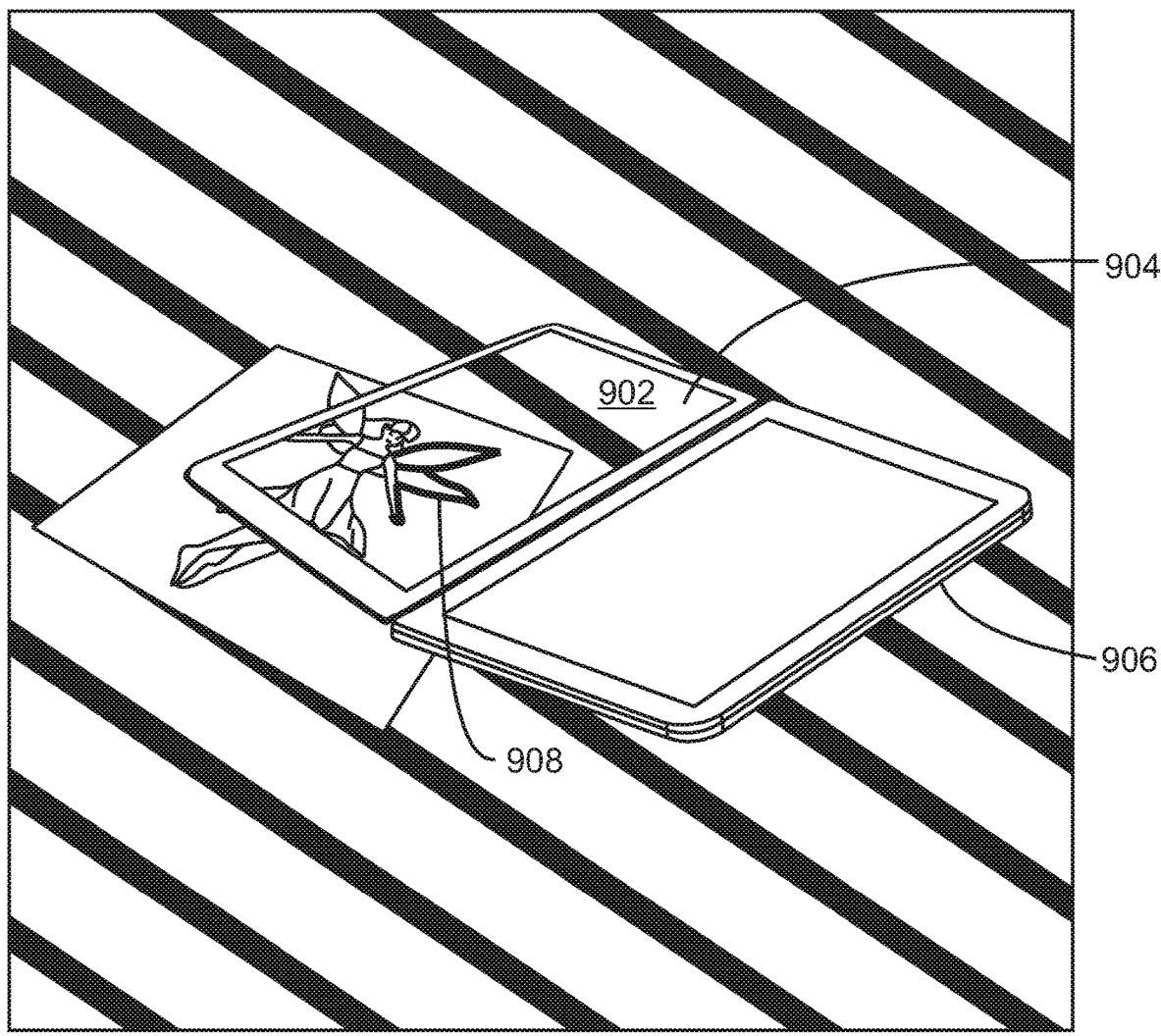
FIG. 9 is a diagram of an example device with a tracing drawn on a touch-input transparent display.

FIG. 9 is a diagram of an example device 900 with a tracing 908 drawn on a touch-input transparent display 902. The transparent display 902 makes it possible to see images beneath the transparent display 902 that may then be traced on the transparent display 902. The tracing may be drawn on the transparent display 902 using any of various touch input mechanisms such as, for example, a stylus or human finger. This tracing feature is useful for creating coloring sheets, or even a coloring book. In addition to tracing, device 900 may also provide the capability to manipulate the tracing 908 by stretching it, rotating it, distorting it, and the like. Software to perform the tracing may be provided via non-transparent components in the frame around the transparent display 902. Alternatively, the counterpart screen 906 may include the non-transparent components running such software. It is additionally noted that the transparent display 902 may be a transparent OLED display. In fact, in some embodiments, transparent displays 102, 202, 302, 402, 502, 602, 702, 802, 902 are transparent organic light emitting diode (OLED) displays.

Figure 10:
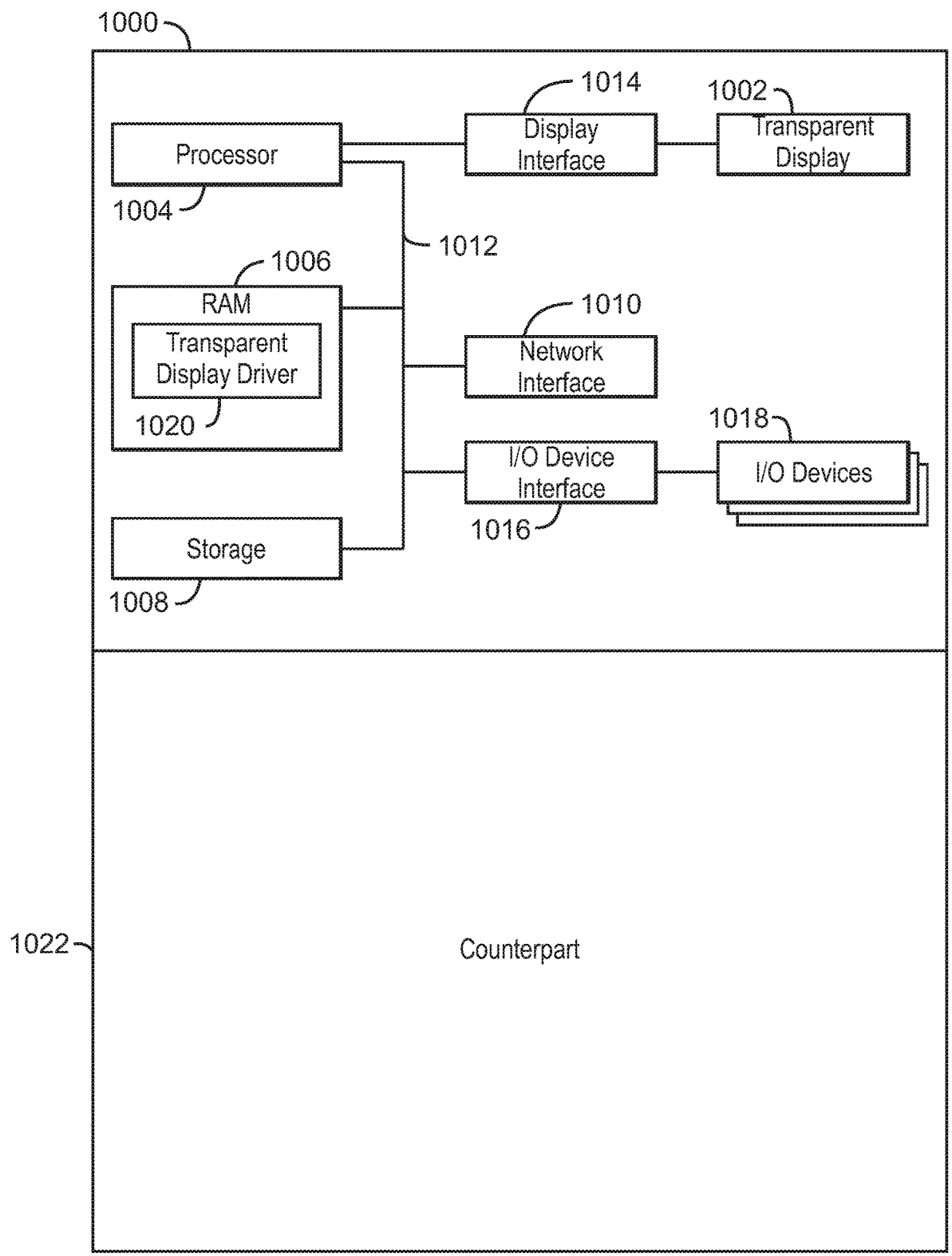
FIG. 10 is a block diagram of an example device with a transparent display.

FIG. 10 is a block diagram of an example device 1000 (for example, a computing device) with a transparent display 1002 connected to a counterpart 1022. In addition to the transparent display 1002, the example device 1000 includes a processor 1004 such as, for example, a central processing unit (CPU), random access memory (RAM) 1006, storage 1008, and a network interface 1010, in communication via a bus 1012. The device 1000 may be, for example, a mobile phone, laptop, tablet, phablet, wearable device, and the like.

The device 1000 may include a processor 1004 that is adapted to execute stored instructions, as well as a RAM 1006 that stores instructions that are executable by the processor 1004. The processor 1004 can be a single core processor, a multi-core processor, a computing cluster, or any number of other configurations. The RAM 1006 can be one or more of random access memory, flash memory, or any other suitable type of memory and/or memory system. The RAM 1006 may include a transparent display driver 1020. The transparent display driver 1020 may operate the transparent display 1002 by setting each of the individual pixels of the transparent display 1002 in an on-mode and an off-mode. In the on-mode a pixel is signaled to display a predetermined color. In the off-mode, the pixel is not signaled, and is thus see-through.

The processor 1004 may also be linked through the bus 1012 (e.g., PCI®, PCI-Express®, NuBus, etc.) to a display interface 1014 adapted to connect the device 1000 to the transparent display 1002. In one embodiment, the example device 1000 includes a system on a chip (SoC) with a processor 10004 and a graphics processing unit. In such an embodiment, the SoC has a dedicated display interface directly to the transparent display 1002. The transparent display 1002 can include organic light emitting diodes (OLEDs), liquid crystal displays (LCD) and/or micro-LEDs, among others. Additionally, the display interface 1014 may provide a connection to other display devices, such as a computer monitor, television, or projector, among others.

In some embodiments, the display interface 1014 can include any suitable graphics processing unit, transmitter, port, physical interconnect, and the like. In some examples, the display interface 1014 can implement any suitable protocol for transmitting data to the display device. For example, the display interface 1014 can transmit data using an embedded display port (eDP) protocol, and the like. In some embodiments, the display interface 1014 can detect a predetermined maximum data rate supported by a physical interconnect in the display interface 1014. The predetermined maximum data rate for the physical interconnect can be detected from a video-BIOS configuration database loaded into registers of the display interface 1014. The display interface 1014 can transmit data to the transparent display 1002, or any other suitable sink device, at the predetermined maximum data rate via a high-definition multimedia interface (HDMI) link, or any other suitable link and/or protocol, including wireless links such as (wifi, WiGig)

In addition, a network interface 1010 may be adapted to connect the device 1000 through the bus 1012 to a network (not shown). The network may be a cellular network, a radio network, a wide area network (WAN), a local area network (LAN), or the Internet, among others, or a combination thereof.

The processor 1004 may be connected through the bus 1012 to an input/output (I/O) device interface 1016 adapted to connect the computing host device 1000 to one or more I/O devices 1018. The I/O devices 1018 may include, for example, a touchscreen, a keyboard, or a pointing device. The I/O devices 1018 may be built-in components of the device 1000, or may be devices that are externally connected to the device 1000.

In some embodiments, the processor 1004 may also be linked through the bus 1012 to a storage device 1008 that can include a hard drive, an optical drive, a USB flash drive, an array of drives, or any combinations thereof. In some embodiments, the storage device 1008 can include any suitable applications, such as the tracing software, virtual keyboard and touchpad software, games and other software for low-power displays, as described above.

In some embodiments, example device 1000 is a stand-alone device. However, in other embodiments, the example device 1000 includes a counterpart 1022. The counterpart 1022 is connected to the device 1000. In some embodiments, the counterpart is a part of the device 1000. The counterpart 1022 may be a cover that provides a background to the transparent display 1002 that makes the display 1002 more easily viewable in bright light. Alternatively, the counterpart 1022 may be and/or include a keyboard, a keyboard and touchpad, a low-power display, a touch-sensitive display, another transparent display, electro-optical paper, a container for the non-transparent components of the device 1000. Additionally, in some embodiments, the counterpart 1022 may be connected to the transparent display 1002, through a foldable, attached, attachable, and/or detachable mechanism. In some embodiments, a foldable, attached, attachable, and/or detachable mechanism connecting a counterpart 1022 to a transparent display 1002 is reversible. Similarly, counterparts 306, 406, 506, 706, 806, 906 may be respectively connected to transparent displays 302, 402, 502, 602, 702, 802, 902, through a foldable, attached, attachable, and/or detachable mechanism. In some embodiments, a foldable, attached, attachable, and/or detachable mechanism connecting a counterpart 306, 406, 506, 706, 806, 906 to a transparent display 302, 402, 502, 602, 702, 802, 902 is reversible. Additionally, in some embodiments, the counterpart 1022 includes the non-transparent components of the example device 1000, i.e., the processor 1004, RAM 1006, storage 1008, etc.

It is to be understood that the block diagram of FIG. 10 is not intended to indicate that the device 1000 is to include all of the components shown in FIG. 10. Rather, the device 1000 can include fewer or additional components not illustrated in FIG. 10 (e.g., additional memory components, embedded controllers, additional modules, additional network interfaces, etc.). Furthermore, any of the functionalities of the device 1000 may be partially, or entirely, implemented in hardware and/or in the processor 1004. For example, the functionality may be implemented with an application specific integrated circuit, logic implemented in an embedded controller, logic implemented in the processor 1004, software (e.g., an application, among others), firmware, or any suitable combination of hardware, software, and firmware.

Although an example embodiment of the disclosed subject matter is described with reference to block and flow diagrams in FIGS. 1-10, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

EXAMPLES

Example 1 is an apparatus including a processor, a memory, and a transparent display. The transparent display includes pixels that appear transparent when in a first operation mode, and appear as a color when in a second operation mode. The memory includes instructions that cause the processor to place a first portion of the pixels in the first operation mode, and to place a second portion of the pixels in the second operation mode.

Example 2 is an apparatus including a processor, a memory, and a transparent display. The transparent display includes pixels that appear transparent when in a first operation mode, and appear as a color when in a second operation mode. The memory includes instructions that cause the processor to place a first portion of the pixels in the first operation mode, and to place a second portion of the pixels in the second operation mode. The apparatus includes a counterpart that is connected with the transparent display, to provide a contrast to the transparent display when the counterpart is positioned opposite a viewing side of the transparent display.

Example 3 is an apparatus including a processor, a memory, and a transparent display. The transparent display includes pixels that appear transparent when in a first operation mode, and appear as a color when in a second operation mode. The memory includes instructions that cause the processor to place a first portion of the pixels in the first operation mode, and to place a second portion of the pixels in the second operation mode. The apparatus includes a counterpart that is connected with the transparent display, to provide a contrast to the transparent display when the counterpart is positioned opposite a viewing side of the transparent display. The counterpart includes a keyboard and touch pad that provide inputs to the apparatus.

Example 4 is an apparatus including a processor, a memory, and a transparent display. The transparent display includes pixels that appear transparent when in a first operation mode, and appear as a color when in a second operation mode. The memory includes instructions that cause the processor to place a first portion of the pixels in the first operation mode, and to place a second portion of the pixels in the second operation mode. The apparatus includes a counterpart that is connected with the transparent display, to provide a contrast to the transparent display when the counterpart is positioned opposite a viewing side of the transparent display. The counterpart includes an electro-optical material that can switch between a black state and a transparent state to provide a black contrast for the transparent display when folded behind the transparent display, or a see through window when folded in front of the transparent display.

Example 5 is an apparatus including a processor, a memory, and a transparent display. The transparent display includes pixels that appear transparent when in a first operation mode, and appear as a color when in a second operation mode. The memory includes instructions that cause the processor to place a first portion of the pixels in the first operation mode, and to place a second portion of the pixels in the second operation mode. The apparatus includes a counterpart that is connected with the transparent display, to provide a contrast to the transparent display when the counterpart is positioned opposite a viewing side of the transparent display. The counterpart includes a low-power display, and wherein the low-power display includes an electrophoretic display (EPD).

Example 6 is an apparatus including a processor, a memory, and a transparent display. The transparent display includes pixels that appear transparent when in a first operation mode, and appear as a color when in a second operation mode. The memory includes instructions that cause the processor to place a first portion of the pixels in the first operation mode, and to place a second portion of the pixels in the second operation mode. The apparatus includes a counterpart that is connected with the transparent display, to provide a contrast to the transparent display when the counterpart is positioned opposite a viewing side of the transparent display. The counterpart includes an electro-optical material that can switch between a black state and a transparent state to provide a black contrast for the transparent display when folded behind the transparent display, or a see through window when folded in front of the transparent display. The transparent display includes a touch screen interface on a backside of the transparent display. The low-power display is visible through the transparent display when the transparent display is positioned over the low-power display.

Example 7 is an apparatus including a processor, a memory, and a transparent display. The transparent display includes pixels that appear transparent when in a first operation mode, and appear as a color when in a second operation mode. The memory includes instructions that cause the processor to place a first portion of the pixels in the first operation mode, and to place a second portion of the pixels in the second operation mode. The apparatus includes a counterpart that is connected with the transparent display, to provide a contrast to the transparent display when the counterpart is positioned opposite a viewing side of the transparent display. The counterpart includes an electro-optical material that can switch between a black state and a transparent state to provide a black contrast for the transparent display when folded behind the transparent display, or a see through window when folded in front of the transparent display. The transparent display includes a touch screen interface on a backside of the transparent display. The low-power display is visible through the transparent display when the transparent display is positioned over the low-power display. In this example, software providing images shown on the low-power display is operable by touch inputs to the touch screen interface on the back side of the transparent display when the transparent display is positioned over the low-power display.

Example 8 is an apparatus including a processor, a memory, and a transparent display. The transparent display includes pixels that appear transparent when in a first operation mode, and appear as a color when in a second operation mode. The memory includes instructions that cause the processor to place a first portion of the pixels in the first operation mode, and to place a second portion of the pixels in the second operation mode. The apparatus includes a counterpart that is connected with the transparent display, to provide a contrast to the transparent display when the counterpart is positioned opposite a viewing side of the transparent display. The counterpart includes an electro-optical material that can switch between a black state and a transparent state to provide a black contrast for the transparent display when folded behind the transparent display, or a see through window when folded in front of the transparent display. The low-power display includes a touch screen interface.

Example 9 is an apparatus including a processor, a memory, and a transparent display. The transparent display includes pixels that appear transparent when in a first operation mode, and appear as a color when in a second operation mode. The memory includes instructions that cause the processor to place a first portion of the pixels in the first operation mode, and to place a second portion of the pixels in the second operation mode. The apparatus includes a counterpart that is connected with the transparent display, to provide a contrast to the transparent display when the counterpart is positioned opposite a viewing side of the transparent display. The counterpart includes an electro-optical material that can switch between a black state and a transparent state to provide a black contrast for the transparent display when folded behind the transparent display, or a see through window when folded in front of the transparent display. The low-power display includes a touch screen interface. The low-power display shows an image of a virtual keyboard that translates touch inputs to keystrokes for software running on the transparent display or the counterpart.

Example 10 is an apparatus including a processor, a memory, and a transparent display. The transparent display includes pixels that appear transparent when in a first operation mode, and appear as a color when in a second operation mode. The memory includes instructions that cause the processor to place a first portion of the pixels in the first operation mode, and to place a second portion of the pixels in the second operation mode. The apparatus includes a counterpart that is connected with the transparent display, to provide a contrast to the transparent display when the counterpart is positioned opposite a viewing side of the transparent display. The counterpart includes a keyboard visible through the transparent display. The transparent display includes a touch screen interface that is accessible when the transparent display is positioned over the keyboard, and the touch screen interface provides inputs to software that translates touches and inputs of the touch screen interface over keys of the keyboard to keystrokes on the keyboard.

Example 11 is an apparatus including a processor, a memory, and a transparent display. The transparent display includes pixels that appear transparent when in a first operation mode, and appear as a color when in a second operation mode. The memory includes instructions that cause the processor to place a first portion of the pixels in the first operation mode, and to place a second portion of the pixels in the second operation mode. In this example, the apparatus includes a frame surrounding a perimeter of the transparent display, the frame includes non-transparent components configured to present images on the transparent display;

Example 12 is an apparatus including a processor, a memory, and a transparent display. The transparent display includes pixels that appear transparent when in a first operation mode, and appear as a color when in a second operation mode. The memory includes instructions that cause the processor to place a first portion of the pixels in the first operation mode, and to place a second portion of the pixels in the second operation mode. In this example, the transparent display includes an organic light-emitting diode (OLED) display.

Example 13 is an apparatus including a processor, a memory, and a transparent display. The transparent display includes pixels that appear transparent when in a first operation mode, and appear as a color when in a second operation mode. The memory includes instructions that cause the processor to place a first portion of the pixels in the first operation mode, and to place a second portion of the pixels in the second operation mode. The apparatus includes a counterpart that is connected with the transparent display, to provide a contrast to the transparent display when the counterpart is positioned opposite a viewing side of the transparent display. In this example, the counterpart is foldable.

Example 14 is an apparatus including a processor, a memory, and a transparent display. The transparent display includes pixels that appear transparent when in a first operation mode, and appear as a color when in a second operation mode. The memory includes instructions that cause the processor to place a first portion of the pixels in the first operation mode, and to place a second portion of the pixels in the second operation mode. The apparatus includes a counterpart that is connected with the transparent display, to provide a contrast to the transparent display when the counterpart is positioned opposite a viewing side of the transparent display. In this example, the counterpart is attachable to the transparent display.

Example 15 is an apparatus including a processor, a memory, and a transparent display. The transparent display includes pixels that appear transparent when in a first operation mode, and appear as a color when in a second operation mode. The memory includes instructions that cause the processor to place a first portion of the pixels in the first operation mode, and to place a second portion of the pixels in the second operation mode. The apparatus includes a counterpart that is connected with the transparent display, to provide a contrast to the transparent display when the counterpart is positioned opposite a viewing side of the transparent display. In this example, the counterpart is attachable to the transparent display. In this example, the counterpart is reversibly attachable to the transparent display.

Example 16 is an apparatus including a processor, a memory, and a transparent display. The transparent display includes pixels that appear transparent when in a first operation mode, and appear as a color when in a second operation mode. The memory includes instructions that cause the processor to place a first portion of the pixels in the first operation mode, and to place a second portion of the pixels in the second operation mode. The apparatus includes a counterpart that is connected with the transparent display, to provide a contrast to the transparent display when the counterpart is positioned opposite a viewing side of the transparent display. In this example, the counterpart is detachable from the transparent display, and the apparatus could be used stand-alone without the counterpart.

Example 17 is an apparatus including a processor, a memory, and a transparent display. The transparent display includes pixels that appear transparent when in a first operation mode, and appear as a color when in a second operation mode. The memory includes instructions that cause the processor to place a first portion of the pixels in the first operation mode, and to place a second portion of the pixels in the second operation mode. The apparatus includes a counterpart that is connected with the transparent display, to provide a contrast to the transparent display when the counterpart is positioned opposite a viewing side of the transparent display. In this example, the counterpart is reversibly detachable from the transparent display, and the apparatus could be used stand-alone without the counterpart.

Example 18 is an apparatus including a transparent display and a counterpart. The transparent display includes pixels that appear transparent when in one operation mode, and appear as a color when in other operation modes. The counterpart includes a second display that is connected with the transparent display. In this example, the second display provides a contrast to the transparent display when the counterpart is positioned opposite a viewing side of the transparent display.

Example 19 is an apparatus including a transparent display and a counterpart. The transparent display includes pixels that appear transparent when in one operation mode, and appear as a color when in other operation modes. The counterpart includes a second display that is connected with the transparent display. In this example, the second display provides a contrast to the transparent display when the counterpart is positioned opposite a viewing side of the transparent display. In this example, the second display includes a low-power, electrophoretic display. The transparent display includes a touch screen interface on a back side of the transparent display. The low-power display is visible through the transparent display when the transparent display is positioned over the low-power display. The software providing images shown on the low-power, electro-phoretic display is operable by touch inputs to the touch screen interface on the back side of the transparent display when the transparent display is positioned over the low-power display.

Example 20 is an apparatus including a transparent display and a counterpart. The transparent display includes pixels that appear transparent when in one operation mode, and appear as a color when in other operation modes. The counterpart includes a second display that is connected with the transparent display. In this example, the second display provides a contrast to the transparent display when the counterpart is positioned opposite a viewing side of the transparent display. In this example, the display in the counterpart includes a transparent display with an electro-optical material that provides a black contrast for the transparent display in one state and the transparent back cover on the other state depends on the electrical signal applied to it Example 21 is an apparatus including a transparent display and a counterpart. The transparent display includes pixels that appear transparent when in one operation mode, and appear as a color when in other operation modes. The counterpart includes a second display that is connected with the transparent display. In this example, the second display provides a contrast to the transparent display when the counterpart is positioned opposite a viewing side of the transparent display. In this example, the second display includes a low-power, electrophoretic display. The transparent display includes a touch screen interface on a back side of the transparent display. The low-power display is visible through the transparent display when the transparent display is positioned over the low-power display. The software providing images shown on the low-power, electro-phoretic display is operable by touch inputs to the touch screen interface on the back side of the transparent display when the transparent display is positioned over the low-power display. The transparent display includes a touch screen interface on a back side of the transparent display. The display is visible through the transparent display when the transparent display is positioned over the low-power display.

Example 22 is an apparatus including a transparent display and a counterpart. The transparent display includes pixels that appear transparent when in one operation mode, and appear as a color when in other operation modes. The counterpart includes a second display that is connected with the transparent display. In this example, the second display provides a contrast to the transparent display when the counterpart is positioned opposite a viewing side of the transparent display. In this example, the second display includes a low-power, electrophoretic display. The transparent display includes a touch screen interface on a back side of the transparent display. The low-power display is visible through the transparent display when the transparent display is positioned over the low-power display. The software providing images shown on the low-power, electro-phoretic display is operable by touch inputs to the touch screen interface on the back side of the transparent display when the transparent display is positioned over the low-power display. The transparent display compX Not all components, features, structures, characteristics, etc., described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus comprising:
a transparent display, the transparent display including pixels to appear transparent when in a first operation mode and to appear as one or more colors when in a second operation mode; and
a connected member reversibly attachable to the transparent display, the connected member including an eletro-optical material than can switch between a black state and a transparent state to provide a black contrast for the transparent display when folded behind the transparent display or a see through window when folded in front of the transparent display.

2. The apparatus of claim 1, further including a processor and a memory, the memory including instructions that cause the processor to place a first portion of the pixels in the first operation mode, and to place a second portion of the pixels in the second operation mode.

3. The apparatus of claim 1, wherein the connected member provides a contrast to the transparent display when the connected member is positioned opposite a viewing side of the transparent display.

4. The apparatus of claim 1, wherein the connected member includes a low-power display, and wherein the low-power display includes an electrophoretic display (EPD).

5. The apparatus of claim 4, wherein the transparent display includes a touch screen interface on a backside of the transparent display, wherein the low-power display is visible through the transparent display when the transparent display is positioned over the low-power display.

6. The apparatus of claim 5, further including software to provide images to be shown on the low-power display, the software to respond to touch inputs to the touch screen interface on the backside of the transparent display when the transparent display is positioned over the low-power display.

7. The apparatus of claim 4, wherein the low-power display includes a touch screen interface.

8. The apparatus of claim 7, wherein the low-power display is to show an image of a virtual keyboard that translates touch inputs to keystrokes for software running on the transparent display or the connected member.

9. The apparatus of claim 1, wherein the connected member includes a keyboard visible through the transparent display, and wherein the transparent display includes a touch screen interface that is accessible when the transparent display is positioned over the keyboard, and wherein the touch screen interface is to provide inputs to software that translates touches and inputs of the touch screen interface over keys of the keyboard to keystrokes on the keyboard.

10. The apparatus of claim 1, further including a frame surrounding a perimeter of the transparent display, the frame including non-transparent components to present images on the transparent display.

11. The apparatus of claim 1, wherein the transparent display includes an organic light-emitting diode (OLED) display.

12. The apparatus of claim 1, wherein the connected member is foldable.

13. The apparatus of claim 1, wherein the connected member is detachable from the transparent display, and the apparatus is structured to stand-alone without the connected member.

14. The apparatus of claim 1, further including:
a touch screen interface;
the connected member including a display that is connected with the transparent display, to provide a contrast to the transparent display when the connected member is positioned opposite a viewing side of the transparent display, and to display a virtual keyboard when the transparent display is positioned over the display, wherein the virtual keyboard is operable by touches on the touch screen interface when the transparent display is positioned over the display.

15. The apparatus of claim 1, further including:
a touch screen interface to accept inputs to the apparatus; and
a frame surrounding the transparent display, the frame including:
a processor; and
memory including instructions to direct the processor to display an image on the transparent display, wherein a background of the image remains transparent.

16. An apparatus comprising:
a transparent display, the transparent display including pixels to appear transparent when in a first operation mode and to appear as one or more colors when in a second operation mode; and
a connected member connected with the transparent display, the connected member including an eletro-optical material than can switch between a black state to provide a black contrast for the transparent display when folded behind the transparent display and a transparent state to provide a see through window when folded in front of the transparent display, the connected member being reversibly detachable from the transparent display, and the apparatus being structured to stand-alone without the connected member.

17. A method of using an apparatus having a transparent display and a connected member, the method comprising:
capturing a photograph of an item in a first environment providing a first background to the item;
cropping the photograph to remove the first background and maintain the item; and
displaying the cropped photograph on the transparent display, wherein a second environment is visible through the transparent display, and wherein the second environment provides a second background to the item;
wherein the connected member is reversibly attachable to the transparent display, wherein the connected member includes an eletro-optical material than can switch between a black state and a transparent state to provide a black contrast for the transparent display when folded behind the transparent display and to provide a see through window when folded in front of the transparent display.

18. The method of claim 17, wherein the item includes furniture, and wherein the method comprises determining if the furniture could fit in the second environment.

19. The method of claim 17, further including determining if the item could fit in the second environment.

20. The method of claim 17, wherein the connected member is detachable from the transparent display, and the transparent display could be used stand-alone without the connected member.

21. The method of claim 17, wherein the transparent display further includes pixels configured to appear transparent when in a first operation mode and configured to appear as one or more colors when in a second operation mode.

* * * * *